F. J. PARDINI.
NUT LOCK.
APPLICATION FILED APR. 21, 1914.
1,126,847.
Patented Feb. 2, 1915.
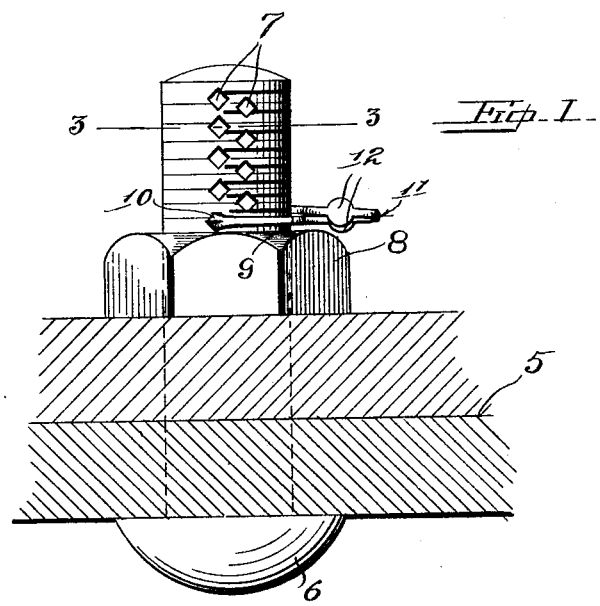
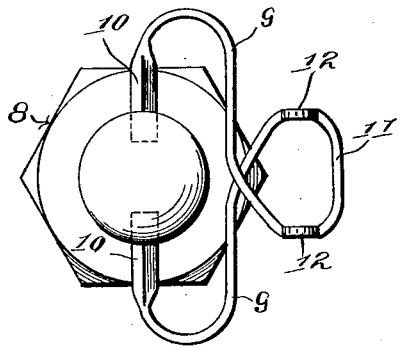
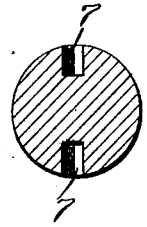
Witnesses
Edw. S. Hall.
B. F. Gawey Jr.
Inventor
Frank J. Pardini.
By
Richard Dewey
his Attorney

UNITED STATES PATENT OFFICE.

FRANK J. PARDINI, OF CARSON CITY, NEVADA.

NUT-LOCK.

1,126,847. Specification of Letters Patent. Patented Feb. 2, 1915.

Application filed April 21, 1914. Serial No. 833,560.

*To all whom it may concern:*

Be it known that I, FRANK J. PARDINI, a citizen of the United States, residing at Carson City, in the county of Ormsby and State of Nevada, have invented certain new and useful Improvements in Nut-Locks, of which the following is a specification.

This invention relates to nut locks and has for its primary object to provide a simple and efficient lock permitting of the ready removal of the nut from the bolt when desired.

Another object of the invention is to leave the nut intact and to associate the locking element with the bolt, so as to positively prevent the accidental displacement of the nut, at the same time, providing for the expeditious removal of the lock from the bolt without the use of tools.

Other objects as well as the nature, characteristic features and scope of my invention will be more readily understood from the following description taken in connection with the accompanying drawings and pointed out in the claims forming a part of this specification.

Referring to the drawings: Figure 1 is a side elevation of the locking means constructed in accordance with my invention and illustrating the application thereof, Fig. 2 is a top plan view of the same, and Fig. 3 is a sectional view taken on the line 3—3 of Fig. 1, illustrating the improved bolt used in the present invention.

In the drawings wherein is illustrated the preferred embodiment of this invention, in order to illustrate the application thereof, a plurality of objects 5 are provided which have engaged therethrough a bolt 6, the latter in the present instance being provided with the usual threaded shank in which is formed staggered squared openings 7, at diametrically opposite points thereon, thereby reducing the weakening of the bolt to a minimum. The nut 8, used in the present invention, is of the ordinary configuration and is threaded on the bolt in the usual manner.

My improved locking element in the present instance comprises a locking key generally designated 9, the opposite ends 10 of which are enlarged and squared conforming to the contour of the openings 7 and adapted for engagement therein, the key 9 being formed of a resilient metal and being crossed to provide a coil 11 intermediate its ends, to afford a maximum amount of resiliency, said coil being provided with parallel buttons 12, integrally formed therewith, for the purpose of expanding the opposite ends 10 or jaws of the key from engagement with the bolt when pressure is exerted on said key. The key is formed from a wire strand, the opposite ends of which are enlarged and squared to provide jaws which engage on opposite sides of the bolt in the openings 7, having portions adjacent said jaws 10 turned over into parallelism therewith and crossed so as to provide the coil 11 previously specified.

In operation, we will assume that the nut has been threaded on the bolt to the desired point. The jaws 10 are then expanded and allowed to contract in the openings 7 as near the outer face of the nut as is possible, as shown to advantage in Fig. 1, it being obvious from the above description that one of the jaws would be in close proximity to the nut, while the opposite jaw would be in spaced relation thereto in view of the staggered positioning of the openings 7, thereby positively preventing the displacement of the nut from the bolt. When it is desired to disengage the jaws 10 from the openings 7, pressure is exerted on the buttons 12, so as to compress the same, thereby expanding the jaws 10 and allowing the nut to be removed from the bolt in the usual manner. It is therefore seen that the locking element may be readily disengaged from the bolt minus the instrumentality of any tool, providing an effective nut-locking means and one which may be readily engaged or disengaged at the option of the operator.

It will be understood that the above description and accompanying drawings comprehend only the general and preferred embodiment of my invention and that various minor changes in details of construction, proportion and arrangement of parts, may be made within the scope of the appended claims without sacrificing any of the advantages of my invention.

Having thus fully described my invention, what I claim as new and desire to secure by Letters Patent is:

1. A nut lock including a bolt and a nut threaded on the bolt, a key for locking the nut on the bolt having the opposite ends thereof enlarged to provide jaws for biting engagement with the bolt exterior of said nut, and buttons in connection with said jaws for automatically disengaging the latter from the bolt when pressure is exerted on said buttons.

2. A nut lock including a bolt and a nut threaded on the bolt, a locking element comprising a resilient strand of wire, the opposite ends of which are enlarged to provide jaws for engagement with the bolt exterior of the nut and being crossed to provide an intermediate coil whereby to permit of the expansion and contraction of said jaws, and buttons formed on said coil for expanding said jaws for disengaging the latter from said bolt.

3. A nut lock including a bolt provided with a plurality of staggered square openings therein, a nut threaded on said bolt, a locking element comprising a wire strand, the opposite ends of which are enlarged and squared to provide jaws for engagement with said squared openings of the bolt, said strands being crossed to provide a central coil whereby a maximum degree of resiliency is provided so as to render the jaws expansible and contractible, and buttons formed in parallel relation on said coil for manually expanding the jaws from the bolt when said buttons are depressed.

In testimony whereof I affix my signature in presence of two witnesses.

FRANK J. PARDINI.

Witnesses:
LUIGI DENER,
DAHAELI GUGLIELMO.

Copies of this patent may be obtained for five cents each, by addressing the "Commissioner of Patents, Washington, D. C."